(12) United States Patent
Lambeth et al.

(10) Patent No.: US 10,880,158 B2
(45) Date of Patent: *Dec. 29, 2020

(54) IDENTIFYING THE REALIZATION STATUS OF LOGICAL ENTITIES BASED ON A GLOBAL REALIZATION NUMBER

(71) Applicant: Nicira, Inc., Palo Alto, CA (US)

(72) Inventors: W. Andrew Lambeth, Palo Alto, CA (US); James Joseph Stabile, Los Altos, CA (US); Ganesan Chandrashekhar, Campbell, CA (US); Pankaj Thakkar, Cupertino, CA (US); Peter J. Balland, III, Dublin, CA (US); Igor Ganichev, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,788

(22) Filed: Mar. 14, 2019

(65) Prior Publication Data

US 2019/0215238 A1 Jul. 11, 2019

Related U.S. Application Data

(63) Continuation of application No. 15/069,706, filed on Mar. 14, 2016, now Pat. No. 10,243,797.

(51) Int. Cl.
*H04L 12/24* (2006.01)
(52) U.S. Cl.
CPC .......... *H04L 41/0803* (2013.01); *H04L 41/06* (2013.01)
(58) Field of Classification Search
CPC .................... H04L 41/06; H04L 41/0803
See application file for complete search history.

(56) References Cited

U.S. PATENT DOCUMENTS 6,393,486 B1 5/2002 Pelavin et al.
7,111,053 B1 9/2006 Black et al.
(Continued)

FOREIGN PATENT DOCUMENTS

AU 2017233504 A1 9/2018
CA 3016691 A1 9/2017
(Continued)

OTHER PUBLICATIONS

Non-Published commonly U.S. Appl. No. 16/276,601, filed Feb. 14, 2019, 79 pages.
(Continued)

*Primary Examiner* — June Y Sison
(74) *Attorney, Agent, or Firm* — Adeli LLP

(57) ABSTRACT

Some embodiments provide a method for determining a realization status of one or more logical entities of a logical network. The method, each time a particular event occurs, increments the value of a realization number and publishes the incremented value to a set of controllers of the logical network. Upon receiving data that specifies the state of a logical entity of the logical network, the method publishes the logical entity state's data to the set of controllers. In some embodiments, the method queries the set of controllers for a realization status of the state data for a set of logical entities that is published to the set of controllers up to a particular point of time. The submitted query, in some embodiments, includes a particular value of the realization number associated with the particular point of time.

20 Claims, 9 Drawing Sheets

(56) References Cited

U.S. PATENT DOCUMENTS

| | | |
|---|---|---|
| 7,266,595 B1 | 9/2007 | Black et al. |
| 7,299,277 B1 | 11/2007 | Moran et al. |
| 7,349,960 B1 | 3/2008 | Pothier et al. |
| 7,860,024 B1 | 12/2010 | Greenberg et al. |
| 10,191,763 B2 * | 1/2019 | Koponen ............... G06F 9/455 |
| 10,225,149 B2 | 3/2019 | Wang et al. |
| 10,241,820 B2 | 3/2019 | Lambeth et al. |
| 10,243,797 B2 | 3/2019 | Lambeth et al. |
| 10,374,924 B1 | 8/2019 | Holland et al. |
| 10,516,574 B2 | 12/2019 | Wang et al. |
| 2002/0112044 A1 | 8/2002 | Hessmer et al. |
| 2002/0116485 A1 | 8/2002 | Black et al. |
| 2002/0161555 A1 | 10/2002 | Deb et al. |
| 2003/0046390 A1 | 3/2003 | Ball et al. |
| 2004/0213247 A1 | 10/2004 | Seki et al. |
| 2005/0091361 A1 | 4/2005 | Bernstein et al. |
| 2005/0169185 A1 | 8/2005 | Qiu et al. |
| 2005/0198247 A1 | 9/2005 | Perry et al. |
| 2006/0041660 A1 | 2/2006 | Bishop et al. |
| 2006/0215564 A1 | 9/2006 | Breitgand et al. |
| 2006/0253566 A1 | 11/2006 | Stassinopoulos et al. |
| 2006/0291387 A1 | 12/2006 | Kimura et al. |
| 2010/0138919 A1 | 6/2010 | Peng et al. |
| 2010/0172453 A1 | 7/2010 | Cankaya et al. |
| 2012/0120964 A1 | 5/2012 | Koponen et al. |
| 2013/0018947 A1 | 1/2013 | Archer et al. |
| 2013/0044636 A1 | 2/2013 | Koponen et al. |
| 2013/0060940 A1 | 3/2013 | Koponen et al. |
| 2014/0029451 A1 | 1/2014 | Nguyen |
| 2014/0189443 A1 | 7/2014 | Xu et al. |
| 2014/0301391 A1 | 10/2014 | Krishnan et al. |
| 2015/0009797 A1 | 1/2015 | Koponen et al. |
| 2015/0016287 A1 | 1/2015 | Ganichev et al. |
| 2015/0063360 A1 | 3/2015 | Thakkar et al. |
| 2015/0067028 A1 | 3/2015 | Kumar et al. |
| 2015/0103661 A1 | 4/2015 | Shen et al. |
| 2015/0263946 A1 | 9/2015 | Tubaltsev et al. |
| 2015/0312326 A1 | 10/2015 | Archer et al. |
| 2016/0057014 A1 | 2/2016 | Thakkar et al. |
| 2016/0112269 A1 | 4/2016 | Singh et al. |
| 2016/0224659 A1 | 8/2016 | Robichaud |
| 2017/0171055 A1 | 6/2017 | Wang et al. |
| 2017/0264483 A1 | 9/2017 | Lambeth et al. |
| 2017/0264489 A1 | 9/2017 | Lambeth et al. |
| 2017/0277557 A1 * | 9/2017 | Koponen ............ H04L 41/0803 |
| 2019/0190780 A1 | 6/2019 | Wang et al. |
| 2020/0084104 A1 | 3/2020 | Wang et al. |

FOREIGN PATENT DOCUMENTS

| | | |
|---|---|---|
| EP | 3411790 A1 | 12/2018 |
| JP | 2017142722 A | 8/2017 |
| KR | 20120072058 A | 7/2012 |
| WO | 2013158920 A1 | 10/2013 |
| WO | 2017160395 A1 | 9/2017 |

OTHER PUBLICATIONS

International Search Report and Written Opinion of commonly owned International Patent Application PCT/US2017/013996, dated Apr. 19, 2017, 12 pages, International Searching Authority (EPO).

* cited by examiner

705

710 ized GRN value to the user.

IDENTIFYING THE REALIZATION STATUS OF LOGICAL ENTITIES BASED ON A GLOBAL REALIZATION NUMBER

CLAIM OF BENEFIT TO PRIOR APPLICATIONS

This application is a continuation application of U.S. patent application Ser. No. 15/069,706, filed Mar. 14, 2016, now published as U.S. Patent Publication 2017/0264489. U.S. patent application Ser. No. 15/069,706 now published as U.S. Patent Publication 2017/0264489, is incorporated herein by reference.

BACKGROUND

In a distributed virtual network (e.g., a logical network), network functions and services are implemented by logical network elements (e.g., a set of logical forwarding elements such as logical switches and logical routers). A definition for each logical network element (logical entity) is received from a user (e.g., network administrator) and the data that defines the logical entity is stored at the management plane of the logical network. The management plane then pushes these data to the control plane of the logical network to realize the logical entities (e.g., to configure and implement the logical entities). Currently, it is difficult or impossible to determine whether a set of logical entities have been realized in the network infrastructure (e.g., in the controllers, hypervisors, etc.) at a particular point of time. Additionally, there is no particular method of identifying the source of problem when a logical entity is not properly realized at a particular instance of time.

BRIEF SUMMARY

Some embodiments provide a method and tool for determining whether a desired state of a set of logical entities (e.g., logical forwarding elements, logical middleboxes, etc.) of a logical network is realized in a network at a particular point of time. In some embodiments, the method queries the control plane of the logical network to identify the realization status of the logical entities at a particular time instance. The method of some embodiments is also able to identify the physical nodes (e.g., controllers and managed forwarding elements) on which the desired states of the logical entities are not realized. In some embodiments, the desired state of logical entities of a logical network includes the data that a management plane (MP) of a logical network generates, based on the logical network's definition (e.g., received from a user), and stores in the MP configuration database. The generated data (desired state), in some embodiments, is pushed to the central control plane (CCP) cluster (e.g., one or more central controllers of the CCP cluster) asynchronously (e.g., through MP channels).

The CCP cluster processes the received data along with the corresponding runtime data for the logical entities that the CCP cluster receives from one or more managed forwarding elements (MFEs) that implement the logical entities. Some embodiments determine that the logical entities are realized in the system (i.e., in the physical network infrastructure on which one or more logical networks are implemented) when the CCP cluster pushes the processed configuration data down to the MFEs (e.g., through a set of local controllers each of which controls a corresponding MFE) in order to configure the logical entities on the MFEs, each of which operates on a hypervisor of a host machine. Some embodiments determine that the logical entities are realized in the system when the logical entities are actually configured on the MFEs.

The realized state of a logical entity, unlike the desired state of the logical entity, deals with an ephemeral system state. That is, the realized state of a logical entity is continuously changing as the system tries to converge to the desired state. In other words, the realized state may become unrealized at any point of time, as the environment of the system (e.g., a datacenter) changes (e.g., a virtual machine migrates, a hypervisor fails, etc.). In some embodiments, the realized state of logical entities can also be changed (updated) by the runtime data (e.g., L2 and L3 addresses of virtual network interfaces) received at the control plane of the logical network.

Instead of querying the state of a logical entity (e.g., a logical switch, a logical switch port, a logical router, etc.) after creating the logical entity to ensure that the logical entity is realized, some embodiments provide a realization determination tool that allows the user to query the realization status of one or more logical entities together at different instances of time. That is, when multiple logical entities are added to a logical network, instead of querying the state of each logical entity to ensure that the entity is realized in the system, the user can query the control plane (e.g., through the management plane) to determine the realization status of every logical entity (or a particular set of logical entities) that up to a particular point of time is published to the CCP cluster.

In order to do so, some embodiments provide a cluster wide monotonically increasing value, which is in fact a state sync barrier that tracks the realization of the desired state of the logical entities at the CCP cluster. This global realization number (GRN) is incremented at different instances of time (e.g., automatically at certain time intervals, manually per user request, or per every desired state update) in some embodiments. The management plane, in addition to publishing the desired state to the CCP cluster, publishes a new GRN value to the CCP cluster each time the GRN is incremented. The CCP cluster then associates the received GRN value with the realization state of the different logical entities that are published to the CCP cluster up to the time that the GRN value is received. In some embodiments, the CCP cluster also associates the GRN to a corresponding runtime state of the logical entities that the control plane receives from the MFEs.

The management plane of some embodiments can then request the realization status of a particular set of logical entities (e.g., specified by a user) that are published to the CCP cluster up to the most recent GRN, or any particular GRN (e.g., given by a user). Some embodiments also provide the realization state of every logical entity that is published to the CCP cluster up to the most recent GRN, or any particular GRN. For example, when a user defines a logical route with multiple logical elements (e.g., logical switches and routers) along the logical route, the realization status of the logical route depends on the realization of every single logical element along the route. As such, in order to identify the status of realization of the logical route, a user can query the realization state of the route at a GRN value that is published after the route is defined.

In order to do so, a user (e.g., a network administrator) can request a GRN increment (e.g., by calling a GRN increment function) after the logical route is defined. Such a request not only increments the GRN and associates the incremented GRN value with realization statuses of the logical entities at the time the request is made, but also returns the incremented GRN value to the user. The user can then query the CCP cluster for the realization status of the logical route up to the received GRN value.

For each GRN that a CCP node (e.g., a controller) has last processed, the CCP node knows the realization status of the logical entities on each MFE that the CCP node manages (e.g., the MFEs for which the CCP node is a master). Thus, when the user asks for realization status of the desired logical objects at a particular GRN (i.e., the user queries the MP for the realized state at the particular GRN), the CCP cluster of some embodiments responds by returning the statuses of all the logical entities up to the particular GRN. In the response, the CCP cluster includes any MFE (e.g., a hypervisor that executes the MFE) that has not realized the logical entities yet. For example, for a distributed firewall (DFW) rule section that is disseminated to a subset of hypervisors (i.e., the logical switches and routers on which the rule section depends span the subset of hypervisors), the CCP nodes include, in the reply to the query, the statuses of the subset of hypervisors that implement the logical forwarding elements. In some embodiments, the CCP nodes only include, in the reply, the hypervisors on which, the logical entities are not realized.

The CCP cluster (e.g., one or more CCP nodes in the CCP cluster) of some embodiments returns a message for the realization status of a logical entity (in response to a realization state query of the logical entity). In some embodiments, the returned message can be a success message, a not success message, or an in progress message. A success status, in some embodiments, indicates that the CCP cluster has processed the received desired state and pushed the processed data to the local control plane (e.g., one or more local controllers that operate alongside the MFEs in the same host machines). In some embodiments, each time the MP increments the GRN, the MP syncs the incremented GRN with the CCP cluster. In some embodiments, one of the controller nodes (e.g., a sharding master controller) assigns the same GRN to the current runtime state kept at the controllers of the CCP cluster. In some embodiments, the realization status for a particular value of the GRN is considered successful when the CCP cluster has processed both the desired state and the corresponding runtime state of the logical entities for the particular GRN value.

In some embodiments, the success message is indicative of not only that the desired state (and the corresponding runtime state) of a logical entity has been processed and published by the CCP cluster, but also that the logical entity is successfully configured on one or more MFEs (operating on host machines or gateways) that implement the logical entity. For example, a success response for realized state of a logical switch, in some such embodiments, means that one or more MFEs that implement the logical switch (e.g., on hypervisors of one or more host machines) are successfully connected to one or more virtual machines that logically connect to the logical switch. It further means that the MFEs have active communications with the control plane (e.g., a master controller of the logical switch) and the management plane (e.g., a master manager of the logical switch) for the logical switch.

An unsuccessful realization response for the status of a logical entity may have different reasons in some embodiments. For example, when one or more CCP nodes have fallen behind in processing the desired state updates, the CCP nodes may return unsuccessful realization of the desired states. Other reasons for unsuccessful realization of the desired state for a logical entity include, when one or more MFEs explicitly indicate that they have failed to implement some changes for a particular value of GRN, when one or more MFEs fall behind in keeping up with desired state update frequency, when some MFEs get disconnected for a long period, etc.

Some embodiments provide a generation number (e.g., within the GRN) to identify the clustering events, slice reassignments, or when the MP database has been installed and/or restored. The generation number, in some embodiments, is incremented each time a clustering event or slice reassignment occurs or each time the management plane database is restored. Such increments, in some embodiments, occur automatically (e.g., with each new clustering event). In some embodiments a user may also (manually) increment the generation number (e.g., when a backup version of the MP database is restored).

In some embodiments the MP queries (e.g., through a remote procedure call) the CCP cluster to ensure that the generation number is synched between all the CCP nodes. Each CCP node, in some such embodiments, replies to the query with its most recent generation number. When the generation number is not the same across all of the replies, the MP can conclude that some clustering change, that has happened recently, has not been processed by some of the CCP nodes yet. In some embodiments, a universally unique identifier (UUID) includes both the generation number and the GRN (e.g., both GRN and generation number could be encoded in a single 64-bit UUID, where the higher 16 bits of the UUID hold the generation number and the lower 48 bits hold the GRN).

Some embodiments provide troubleshooting data to help identify the source of various problems in the realization of the desired state. Some embodiments provide different levels of details for problematic logical entities based on the nature and location of the identified problems. Some embodiments provide the troubleshooting data with respect to specific logical elements that fail to become realized.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
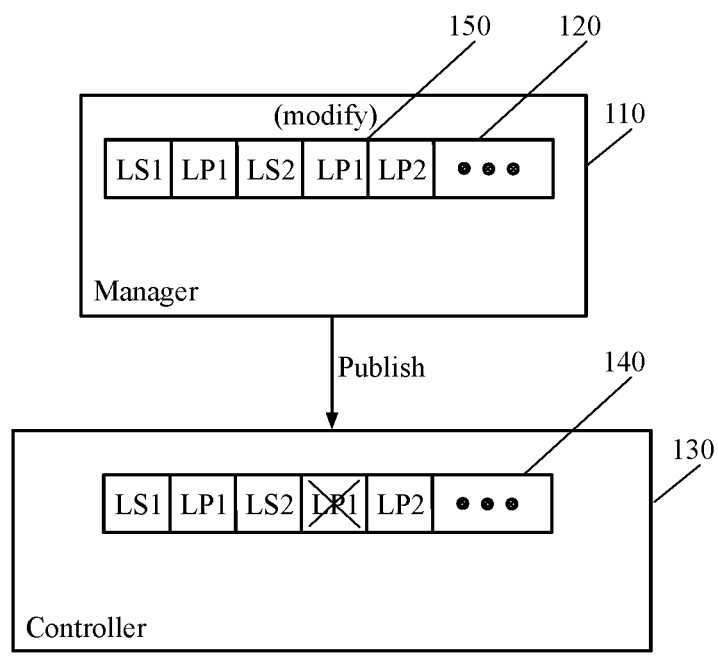
FIG. 1 illustrates the creation and publication of a set of logical entities for a logical network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method and tool for determining whether a desired state of a set of logical entities (e.g., logical forwarding elements, logical middleboxes, etc.) of a logical network is realized in a network at a particular point of time. In some embodiments, the method queries the control plane of the logical network to identify the realization status of the logical entities at a particular time instance. The method of some embodiments is also able to identify the physical nodes (e.g., controllers and managed forwarding elements) on which the desired states of the logical entities are not realized. In some embodiments, the desired state of logical entities of a logical network includes the data that a management plane (MP) of a logical network generates, based on the logical network's definition (e.g., received from a user), and stores in the MP configuration database. The generated data (desired state), in some embodiments, is pushed to the central control plane (CCP) cluster (e.g., one or more central controllers of the CCP cluster) asynchronously (e.g., through MP channels).

The CCP cluster processes the received data along with the corresponding runtime data for the logical entities that the CCP cluster receives from one or more managed forwarding elements (MFEs) that implement the logical entities. Some embodiments determine that the logical entities are realized in the system (i.e., in the physical network infrastructure on which one or more logical networks are implemented) when the CCP cluster pushes the processed configuration data down to the MFEs (e.g., through a set of local controllers each of which controls a corresponding MFE) in order to configure the logical entities on the MFEs. Some embodiments determine that the logical entities are realized in the system when the logical entities are actually configured on the MFEs (also referred to as transport nodes in some embodiments).

The realized state of a logical entity, unlike the desired state of the logical entity, deals with an ephemeral system state. That is, the realized state of a logical entity is continuously changing as the system tries to converge to the desired state. In other words, the realized state may become unrealized at any point of time, as the environment of the system (e.g., a datacenter) changes (e.g., a virtual machine migrates, a hypervisor fails, etc.). In some embodiments, the realized state of logical entities can also be changed (updated) by the runtime data (e.g., L2 and L3 addresses of virtual network interfaces) received at the control plane of the logical network.

Instead of querying the state of a logical entity (e.g., a logical switch, a logical switch port, a logical router, etc.) after creating the logical entity to ensure that the logical entity is realized, some embodiments provide a realization determination tool that allows the user to query the realization status of one or more logical entities together at different instances of time. That is, when multiple logical entities are added to a logical network, instead of querying the state of each logical entity to ensure that the entity is realized in the system, the user can query the control plane (e.g., through the management plane) to determine the realization status of every logical entity (or a particular set of logical entities) that up to a particular point of time is published to the CCP cluster.

A logical network, in some embodiments, includes a set of logical entities that are placed on different logical paths of the network. Examples of logical entities in a logical network include logical forwarding elements (LFEs) such as logical L2 switches and logical L3 routers, logical middleboxes such as logical firewalls and logical load balancers, etc. The logical network entities, in some embodiments, also include other network elements including a source or destination data compute node (DCN) and a tunnel endpoint (e.g., implemented by a MFE). While a DCN or tunnel endpoint typically operates on a single host machine (or gateway), a logical forwarding element or logical middlebox spans several different MFEs (e.g., software and/or hardware managed forwarding elements) that operate on different machines.

The logical forwarding elements of a logical network logically connect several different DCNs (e.g., virtual machines (VMs), containers, physical machines, etc.) that run on different host machines, to each other and to other logical and/or physical networks. The logical forwarding elements that logically connect the DCNs, in some embodiments, define a logical network topology for a user (e.g., a tenant) of a hosting system (e.g., a datacenter). In some embodiments, different subsets of DCNs reside on different host machines that execute software managed forwarding elements (MFEs). Each MFE operates on a host machine and implements the LFEs of the logical network to which a subset of DCNs that run on the host machine is logically connected.

The software MFE, in some embodiments, is a software instance that is instantiated in a virtualization software (e.g., a hypervisor) of the host machine. Implementing the LFEs on a host machine, in some embodiments, includes performing network traffic forwarding processing for the packets that are originated from and/or destined for a set of DCNs that resides on the host machine on which the MFE operates. The LFEs are also implemented by one or more hardware MFEs (e.g., Top of Rack (TOR) switches) in order to logically connect the physical machines (e.g., servers, host machines, etc.) that are connected to the hardware MFEs to other DCNs of the logical network. Additionally, as a particular physical host machine may host DCNs of more than one logical network (e.g., belonging to different tenants), the software MFE running on the host machine (or a hardware MFE) may be virtualized in order to implement different sets of LFEs that belong to different logical networks.

In some embodiments, a central management plane (CMP) cluster (e.g., a master manager in the CMP cluster) generates logical objects data for a logical network topology. In some embodiments, a user (e.g., a network administrator) provides the logical network definition (e.g., logical network topology) to the CMP cluster through application programming interface (API) calls. The CMP cluster, based on the received logical network definition, generates the logical entities data (e.g., by defining the logical switches, logical routers, logical middleboxes, etc.) and stores the generated data (i.e., the desired state of the logical entities) in the management plane database.

The CMP cluster of some embodiments also pushes the desired state to one or more controllers in a central control plane (CCP) cluster. The MFEs (e.g., MFEs operating in the host machines and gateway machines) also push runtime data related to logical entities that the MFEs implement (i.e., the discovered state of the logical entities) to the CCP cluster. Typical runtime data, in some embodiments, includes layer 2 control plane tables such as virtual tunnel endpoint (VTEP) tables, media access control (MAC) tables, address resolution protocol (ARP) tables; layer 3 routing tables such as routing information base (RIB) tables, forwarding information base (FIB) tables; statistics data collected from MFEs; etc.

The CCP cluster processes the logical entity definition data (i.e., the desired state) received from the management plane along with the runtime data (i.e., the discovered state) received from the MFEs in order to configure the logical entities on the MFEs (i.e., to realize the logical entities in the system). In other words, the processed configuration data for one or more logical entities of a logical network and the corresponding runtime data that are stored in the CCP cluster constitute the realized state of the logical entities. The CCP cluster then pushes down the realized state of the logical entities to the host machines (and gateways). Some embodiments determine that the desired state of a logical entity is realized when the CCP cluster (e.g., a controller in the CCP cluster) pushes down the processed configuration data to the MFEs. Some embodiments determine that the state of a logical entity is realized when not only the configuration data is processed and distributed by the controllers, but also is the logical entity indeed configured on the MFEs that implement the logical entity.

The configuration data that is distributed to the host machines defines common forwarding behaviors of the MFEs that operate on the host machines in order to implement the logical entities. In some embodiments, a local controller that operates on each host machine (e.g., in the hypervisor of the host machine) receives the configuration data from the CCP cluster first. The local controller then generates customized configuration data that defines specific forwarding behaviors of each MFE that operates on the same host machine on which the local controller operates. The CCP cluster shares the realized state of the logical entities implemented on each MFE with other MFEs that implement the logical entities in order to facilitate the communication of logical network traffic between the different MFEs.

To summarize, the MFEs (i.e., managed forwarding elements) of a logical network are the source of runtime or discovered state of the logical entities, while the MP is the source of the desired state of the logical entities. The CCP cluster processes (combines) these two states to realize the logical entities. The local controllers receive the realized state from the CCP cluster in order to configure the logical entities of the logical network on their corresponding MFEs.

Currently it is difficult or sometimes impossible for a user to determine whether the desired state of a set of logical entities (that the user has created) have been realized in the network infrastructure (e.g., in the CCP cluster and the MFEs). FIG. 1 illustrates the creation and publication of a set of logical entities for a logical network. More specifically, this figure shows how a user can request (e.g., through API calls) the management plane to create one or more logical entities and publish these logical entities to the control plane. FIG. 1 includes a manager 110 (e.g., a manager computer or application in the central management plane cluster), a desired state transactions queue 120, a controller 130 (e.g., a controller computer or application in the CCP cluster), and a realized state queue 140 that shows whether or not the desired state transactions are processed (realized) in the control plane.

This figure shows that the manager 110 has generated (e.g., through user API requests) a logical switch LS1, a logical port LP1 for the logical switch LS1, a logical switch LS2, and a logical port LP2 for the logical switch LS2. However, before the manager creates LP2, a modification request 150 that changes the logical port LP1 is received at the desired state transactions queue 120. This modification request may be received from a user or may be received through a change (e.g., in the runtime data) in the logical network or the physical infrastructure that implements the logical network.

The figure also shows that when the manager 110 publishes the desired state to the CCP cluster (e.g., through a CCP handler module), all of the created logical entities are realized at the controller 130 except for the modification of the logical port LP1. In other words, the logical port LP1 is created and at one point of time realized in the control plane, however, the modification of LP1 has not been realized in the control plane. Unless the CCP cluster employs a mechanism to maintain the state of the logical entities at different stages, determining the realization status of the logical entities at these different stages is almost impossible.

In order to maintain the state of logical entities, some embodiments provide a cluster wide monotonically increasing value, which is in fact a state sync barrier that tracks the realization of the desired state of the logical entities at the CCP cluster. This global realization number (GRN) is incremented at different instances of time (e.g., automatically at certain time intervals, manually per user request, or per every desired state update) in some embodiments. The management plane, in addition to publishing the desired state to the CCP cluster, publishes a new GRN value to the CCP cluster each time the GRN is incremented. The CCP cluster then associates the received GRN value with the realization state of the different logical entities that are published to the CCP cluster up to the time that the GRN value is received. In some embodiments, the CCP cluster also associates the GRN to a corresponding runtime state of the logical entities that the control plane receives from the MFEs.

The management plane of some embodiments can then request the realization status of a particular set of logical entities (e.g., specified by a user) that are published to the CCP cluster up to the most recent GRN, or any particular GRN (e.g., given by a user). Some embodiments also provide the realization state of every logical entity that is published to the CCP cluster up to the most recent GRN, or any particular GRN. For example, when a user defines a logical route with multiple logical elements (e.g., logical switches and routers) along the logical route, the realization status of the logical route depends on the realization of every single logical element along the route. As such, in order to identify the status of realization of the logical route, a user can query the realization state of the route at a GRN value that is published after the route is defined.

In order to do so, a user (e.g., a network administrator) can request a GRN increment (e.g., by calling a GRN increment function) after the logical route is defined. Such a request not only increments the GRN and associates the incremented GRN value with realization statuses of the logical entities at the time the request is made, but also returns the incremented GRN value to the user. The user can then query the CCP cluster for the realization status of the logical route up to the received GRN value.

Figure 2:
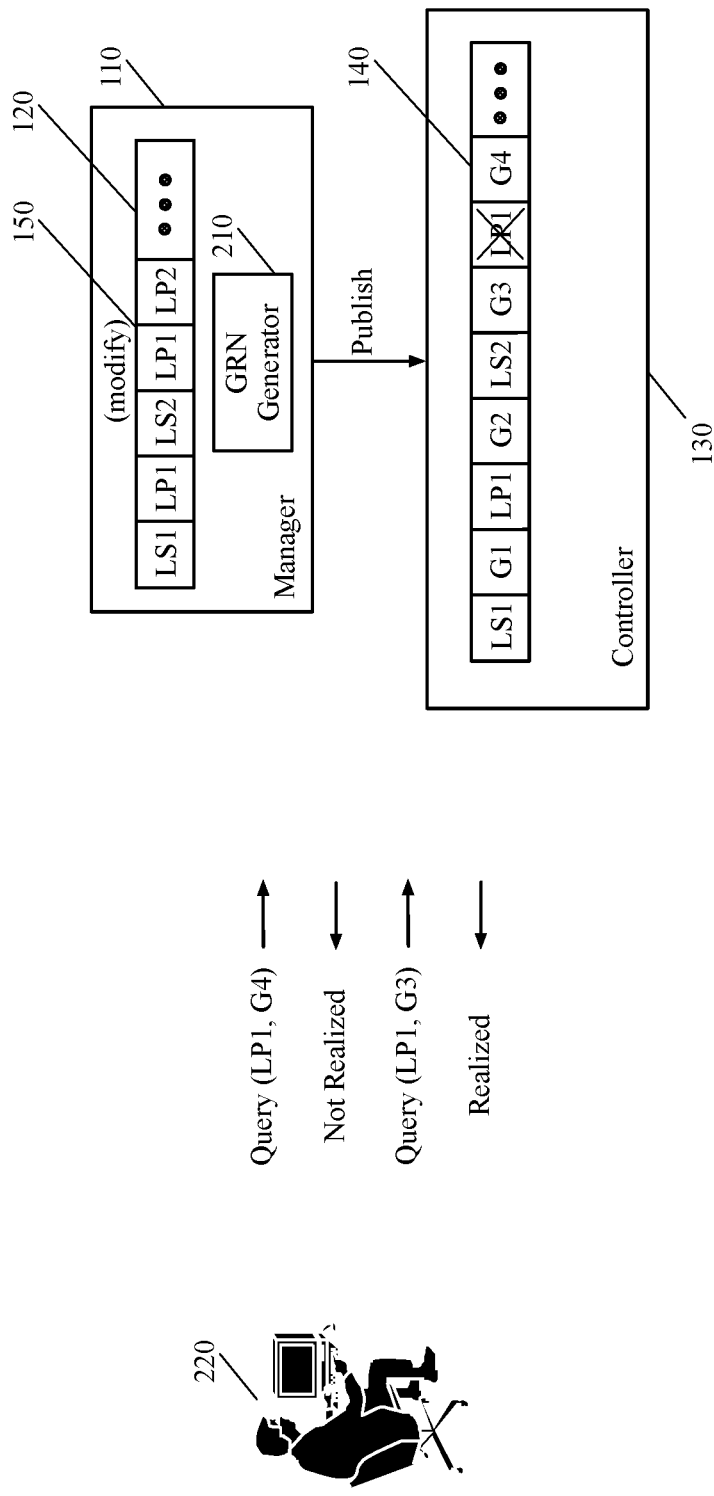
FIG. 2 illustrates a user keeping track of the realization status of logical entities of a logical network using a global realization number (GRN).

FIG. 2 illustrates a user keeping track of the realization status of logical entities of a logical network using a global realization number (GRN). Specifically, this figure shows that a user keeps track of the realization of a logical port, that the user has created for a logical switch of a logical network, using different GRN values. The manager 110, similar to the manager 110 of FIG. 1, includes a desired state transactions queue 120 which holds a logical switch LS1, a logical port LP1 for the logical switch LS1, a logical switch LS2, and a logical port LP2 for the logical switch LS2. The desired state transactions queue 120 has also received a modification 150 to the logical port LP1 before receiving the logical port LP2.

Unlike FIG. 1, however, this figures shows that the manager 110 also includes a GRN generator module 210 that increments the value of a GRN and publishes the incremented value to the controller 130 after each desired state update in the desired state transactions queue 120. As will be discussed further below by reference to FIG. 4, incrementing the GRN value after each desired state update and publishing the incremented GRN is only one way of publication of the GRN to the control plane that the management plane of some embodiments perform.

In some embodiments the management plane increments the GRN value upon receiving a user request, while in some other embodiments the GRN value is incremented automatically at certain time intervals (e.g., that can be adjusted by a user). Yet in some other embodiments, the GRN value can be incremented and published to the control plane using two or all of the aforementioned three methods. That is, while the GRN value is incremented and published at preset time intervals, if an update to the desired state occurs, the management plane increments the GRN value and publishes it to the control plane. Additionally, a user can force an increment and publication of the GRN value manually.

In FIG. 2, after each desired state update, the GRN generator 210 increments the value of the GRN and publishes the new value to the controller 130. As the figure shows, after publication of logical switch LS1 to the realized state queue 140, the GRN generator 210 has incremented the value of the GRN G to G1 and published this new value to the controller 130. Similarly, the new values G2, G3, and G4 are generated and published to the controller 130 after the publications of logical port LP1, logical switch LS2, and modification to logical port LP1, respectively. The figure also shows that the modification to logical port LP1 has not been realized in the system (as the cross over LP1 in the realized state queue 140 indicates).

Finally, the figure shows that the user 30 has issued a query to the management plane for the realization status of the logical port LP1 at the GRN value G4. In response to this query, the management plane queries the control plane for the same and returns a "Not Realized" response to the user. As such, the user identifies that the modification to the logical port LP1 has failed and not realized in the system. The user then queries the management plane one more time for the realization status of LP1 at GRN value G3 (which shows the realization status of this port at some point of time before the modification of the port). This time, the management plane returns (after querying the control plane) "Realized" in response to the query, which indicates that at GRN G3. From the above two queries the user can conclude that the logical port LP1 is realized in the system after it was created, but failed to be realized after the logical port was modified. As shown, a user can keep track of the logical port LP1 at different points of time by using different GRN values.

As described above, for each GRN that a CCP node (e.g., a controller) has last processed, the CCP node knows the realization status of the logical entities on each MFE that the CCP node manages (e.g., the MFEs for which the CCP node is a master). That is, when a CCP node receives the desired and runtime states of a logical entity, the CCP node is responsible to configure the logical entity only on a particular set of MFEs of the network. This particular set of MFEs (i.e., hypervisors on which the MFEs run) is assigned by a network administrator in some embodiments. Alternatively, or conjunctively, in some embodiments, the set of hypervisors that a CCP node manages is assigned automatically by a manager computer or a sharding controller and based on the workload of the CCP nodes.

Thus, when the user asks for realization status of the desired logical objects at a particular GRN (i.e., the user queries the MP for the realized state up to the particular GRN), the CCP cluster of some embodiments responds by returning the statuses of all the logical entities up to the particular GRN. In the response, the CCP cluster includes any MFE (e.g., a hypervisor that executes the MFE) that has not realized the logical entities yet. For example, for a distributed firewall (DFW) rule that is disseminated to a subset of hypervisors (i.e., the logical switches and routers on which the firewall rule depends span the subset of hypervisors), the CCP nodes include, in the reply to the query, the statuses of the subset of hypervisors that implement the logical forwarding elements. In some embodiments, the CCP nodes only include, in the reply, the hypervisors on which, the logical entities are not realized.

Figure 3:
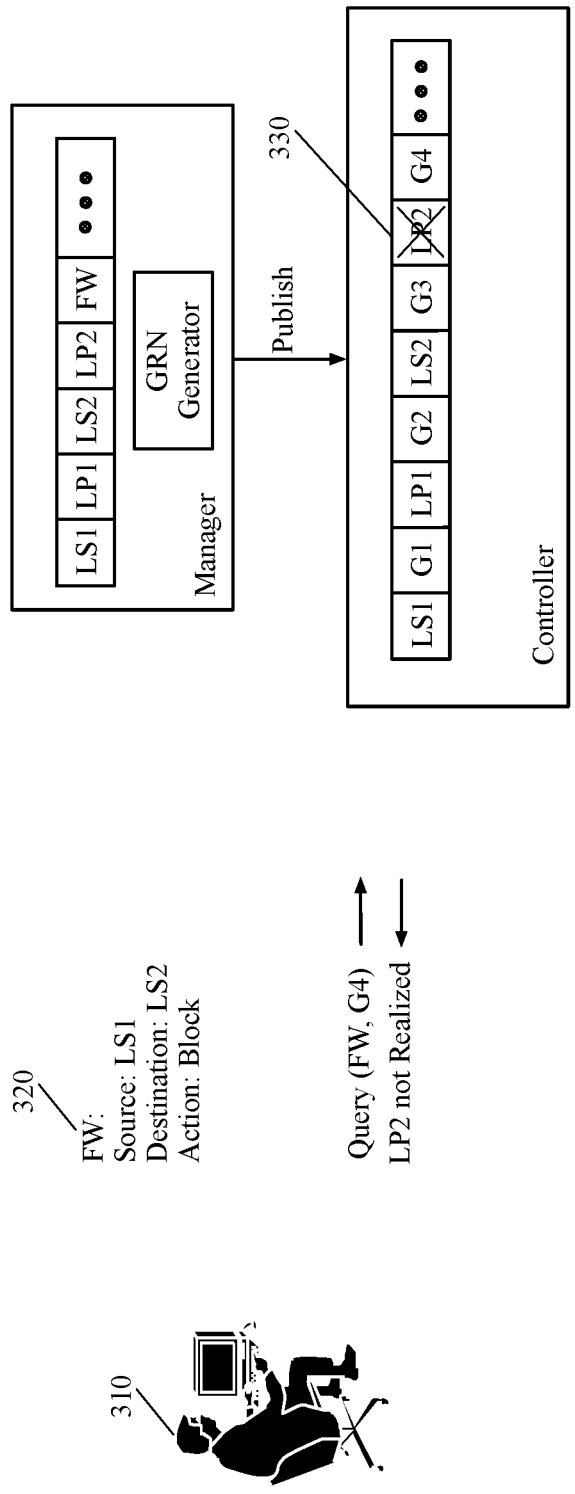
FIG. 3 illustrates an example of creating a distributed firewall rule and querying the control plane (e.g., through the management plane) for realization status of the firewall rule.

FIG. 3 illustrates an example of creating a distributed firewall rule and querying the control plane (e.g., through the management plane) for realization status of the firewall rule. The figure shows that a user 310 creates (e.g., through API calls) two logical switches and thereafter a logical firewall 320 that depends on the logical switches. More specifically, the user has created a first logical switch LS1, a first logical port LP1 for the first logical switch, a second logical switch LS2, a second logical port LP2 for the second logical switch, and a logical firewall FW. The user then has added a firewall rule 320 to the firewall FW that specifies any network traffic from logical switch LS1 to logical switch LS2 should be blocked. As shown, the firewall rule 320 specifies that any packet with a source address (e.g., IP address) of logical switch LS1 and destination address of LS2 should be blocked in the system.

The user would like to be able to determine whether the logical firewall is realized in the system at this point (i.e., after the firewall rule is added). As the illustrated example shows, realization of a single distributed firewall (DFW) rule may depend on many logical switches, on their ports, as well as other network elements that are not shown (e.g., on connections to logical routers, on IP prefixes configured on logical router ports, on spoof guard configurations, on container configurations, etc.). As such, in order to identify the status of realization of the DFW rule, a user can query the GRN after the creation of the DFW rule in order to determine the realization status of all the logical entities on which the rule depends.

In this example, the management plane increments the GRN value after each desired state update. Therefore, after each desired state publication, a new incremented value for the GRN is also published to the control plane. That is, the incremented values G1, G2, G3, and G4 are associated with logical entities LS1, LP1, LS2, and LP2, respectively. However, as the cross over the logical port 330 indicates, all the logical entities on which the firewall rule depends are realized in the system except for the logical port LP2. As such, when the user 310 queries the system for realization status of the firewall FW at GRN G4, in some embodiments, the management plane responds by indicating that logical port LP2 is the only logical entity that is not realized.

Some other embodiments do not provide such level of granularity when they provide a realization status report. Instead, some such embodiments provide information about the physical nodes (e.g. host machines, gateway machines, etc.), on which one ore more logical entities are not properly realized. In the illustrated example, when the realization status of the DFW rule is queried, some embodiments provide a report that identifies one or more physical nodes (i.e., one or more MFEs) that implement the non-realized logical port LP2. As will be described in more detail below, a logical element might be published to the control plane, but not realized in one or more physical nodes in a set of physical nodes that implement the logical entity. That is, as described above, a logical entity spans several different physical nodes (i.e., several different MFEs that execute on the physical nodes). As such, the logical entity might be pushed to the different physical nodes but not realized on a subset of the physical nodes. Some embodiments report only the subset of physical nodes (and/or the MFEs that execute on the subset of nodes), on which the logical entity has not been properly realized.

In some embodiments, when the management plane reports that a particular logical entity has not been realized, such a report does not necessarily mean that the logical entity has failed (and for example should be regenerated). Some embodiments report that a logical entity is not realized at a particular point of time simply because the realization process of the logical entity has not been completed by the control plane at that time. Therefore, if a user later on queries the system with a new GRN, the same logical entity that was reported as not realized before, might be shown as realized in a response to the new query.

Although in the above example, the GRN is incremented after each API call (i.e., after each logical entity is generated and published to the control plane), in some embodiments a user can manually increment the GRN after a logical entity is created. For example when a user makes a logical change (e.g., provisions an application to a data center) that requires one hundred API calls to implement the logical change, the user would not be interested in the realization status of the twentieth or the thirty-seventh call. The user would be most probably interested in the realization status of the application (i.e., the realization status after all of the 100 API calls are made). In this type of situation, instead of, or in conjunction with, the system incrementing the GRN after every API call, the user increments the GRN after the last API call. In other words, the act of manually incrementing the GRN allows the user to receive a GRN value that can be used to track the realization status of the logical change.

As stated above, the GRN value can be incremented in different ways in some embodiments. In some embodiments, the GRN is auto-incremented periodically using a frequency (e.g., defined in milliseconds). In some such embodiments, after each increment, a request is sent to all of the CCP nodes so that the CCP cluster can keep track of the latest barrier number (i.e., the GRN) managed by the management plane. Alternatively, or conjunctively, some embodiments allow force increment of the GRN (i.e., manual increment). That is, a user is also able to manually increment the GRN (e.g., using an API call such as a REST API call). In some embodiments, in order to manually increment the GRN and at the same time to identify the latest GRN value, a particular GRN increment function is called by the user, which increments the GRN value and returns the incremented value to the user at the same time.

Some embodiments increment the GRN after each desired state update. That is, some embodiments increment the GRN whenever a new API call for creating, modifying, or removing a logical entity is received and after the generated logical entity is sent to the CCP cluster for realization. For example, when an API call (e.g., REST API call POST/PUT/DE-LETE) for a logical switch is received, the GRN is incremented and sent to the control cluster after the logical switch message was published to the CCP cluster. In this method of GRN generation, the CCP cluster is in a good position to return the realized state of the logical switch based on a given GRN.

Some embodiments increment the GRN after each desired state update, but in a different manner than the manner explained above. That is, some embodiments increment the GRN immediately after a new API call for creating, modifying, or removing a logical entity is received and before the generated logical entity is sent to the CCP cluster for realization. In this manner of GRN generation, however, the CCP cluster will not be able to determine the realization status of the logical entity queried, and as such report that the realization state of the logical entity is in progress, or alternatively, the logical entity is not realized yet. Some embodiments employ a combination of two or more of the above-explained methods at the same time while in other embodiments the user is able to select one or more methods of GRN generation (e.g., for each different cluster).

In some embodiments, the GRN does not have to be incremented exactly once for each API call. For example, when two users (e.g., two tenants of a datacenter, two network administrators for the same tenant, etc.) modify their DFW configurations and then issue the API calls to increment the GRN (e.g., within a threshold period of time), some embodiments increment the GRN value only once and return the same number to both of the users. This type of relaxation allows limiting the concurrent modification exceptions imposed on the GRN in some such embodiments.

Additionally, in some embodiments, the GRN does not have to be a variable that contains one value at a time. The GRN variable, in some embodiments, is a vector (array) of numbers. For example, the GRN of some embodiments is an array with one element (number) for all logical switches, one element for all logical switch ports, one element for all logical routers, etc. Having an array of values instead of one single value for a GRN in these embodiments allows for more concurrency at the expense of higher transmission costs and a slightly higher complexity.

Figure 4:
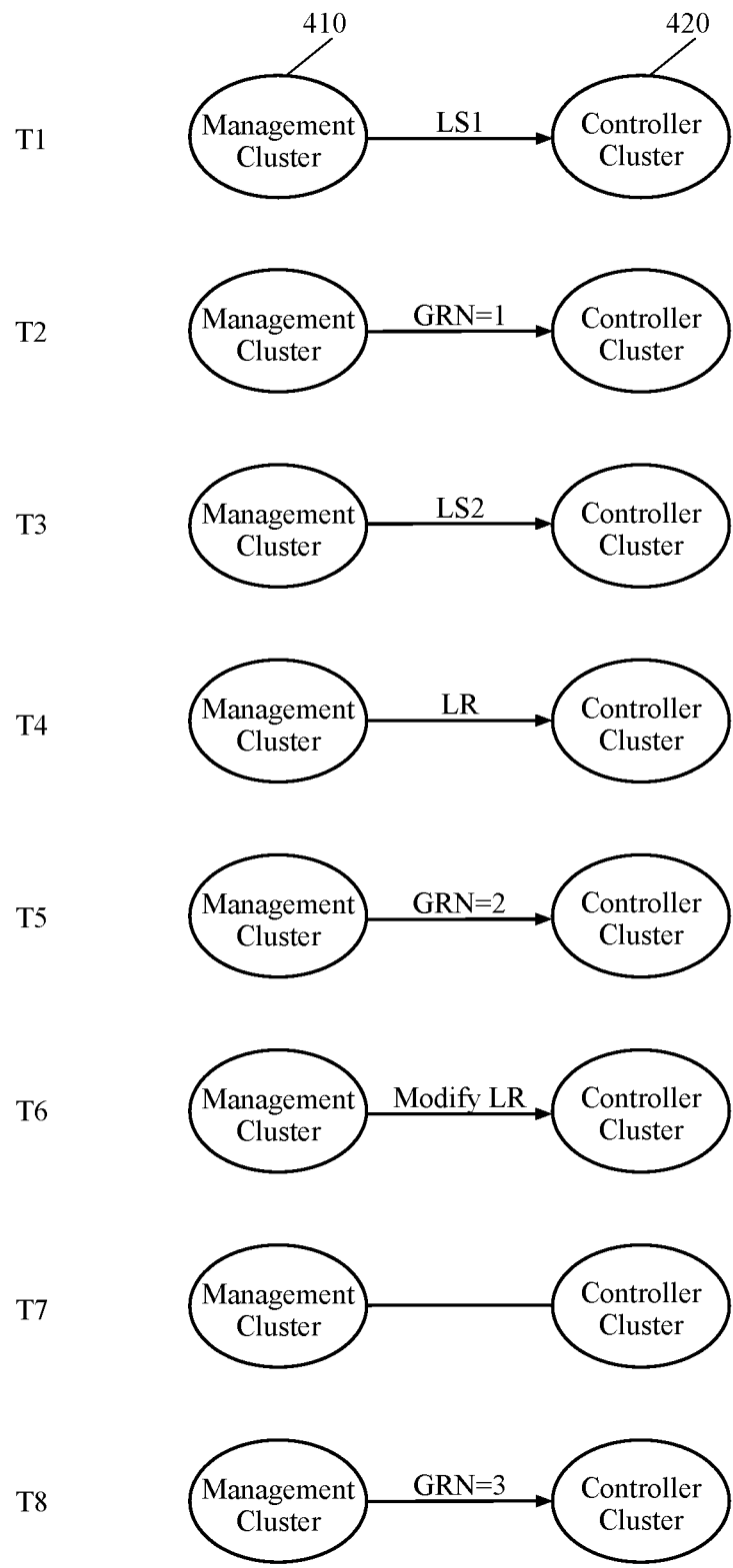
FIG. 4 illustrates one method of updating (incrementing) the GRN in some embodiments, which updates the GRN value automatically at certain time intervals.

FIG. 4 illustrates one method of updating (incrementing) the GRN in some embodiments. The illustrated method updates the GRN value automatically at certain time intervals (e.g., every 10 seconds). In some embodiments the duration between each update is adjustable (e.g., by a network administrator, by an operator, etc.). The figure shows that at different instances of time the management plane (e.g., a central management plane (CMP) cluster) increments a GRN and publishes the incremented value to the control plane (e.g., a CCP cluster), while one or more logical entities are updated between these instances of time (or no logical entity is created or updated during the time intervals).

As shown in this figure, at time instance T1, the management plane 410 publishes a logical switch LS1 to the control plane 420. At time instance T2 (e.g., five seconds after T1), the management plane publishes a GRN having the GRN value 1 to the control plane. Then, the management plane publishes a second logical switch LS2 at time instance T3 (e.g., five seconds after T2). After publishing the second logical switch, however, the management plane does not increment the GRN and instead, as shown, publishes a logical router LR (at time instance T4) to the control plane. This is because the GRN update time at time T4, which is 5 seconds after time T3, is not reached yet (e.g., the time intervals in this example is set to be every 15 seconds).

At time instance T5, which is 5 seconds after T4, the management plane issues a new value G2 for the GRN to the control plane since the time interval between T2 (last time GRN is updated) and T5 is 15 seconds, which was originally set to be the publication time of the GRN. Then, at time T6, the management plane 410 issues a modification to a previously created logical entity (i.e., logical router LR) to the control plane 420. At time T7, there is no transaction between the control plane and the management plane. This is because at this time, the user or management plane has not modified or created any logical entity and at the same time, T7 is only 10 seconds after the last GRN update and as such the GRN should not be published at this time instance either. Finally, the management plane 410 increments the GRN value to G3 and publishes this new value to control plane 420 at time instance T8, which is 15 seconds after T5 (i.e., the last time GRN was incremented and published).

As described above, the CCP cluster of some embodiments includes one or more controllers that configure one or more logical networks for one or more tenants of a hosting system (e.g., a datacenter). In some embodiments, the CCP cluster (1) receives data that defines a logical network (e.g., from the CMP cluster), (2) receives runtime data from a set of MFEs (e.g., through a corresponding set of local controllers), (3) based on the received definition and runtime data, computes configuration and forwarding data that define forwarding behaviors of a set of logical forwarding elements for the logical network, and (4) distributes the computed data to a set of local controllers operating on a set of host machines.

In some embodiments, each local controller, along with a managed forwarding element, resides on a host machine (e.g., in the virtualization software of the host machine) that executes one or more DCNs of the logical network. The DCNs of the logical network that execute on different host machines logically connect to each other (and to other physical or logical networks) through the set of logical forwarding elements (e.g., logical switches, logical routers, etc.).

In some embodiments, each local controller, after receiving the logical network data from the CCP cluster, generates configuration and forwarding data that defines forwarding behaviors of the MFE that resides on the same host machine alongside the local controller. The local controller then distributes the generated data to the MFE that operates on the same host machine. The MFE implements the set of logical forwarding elements based on the configuration and forwarding data received from the local controller. Each MFE can be connected to several different DCNs, different subsets of which may belong to different logical networks of different tenants. As such, the MFE is capable of implementing different sets of logical forwarding elements for different logical networks.

Figure 5:
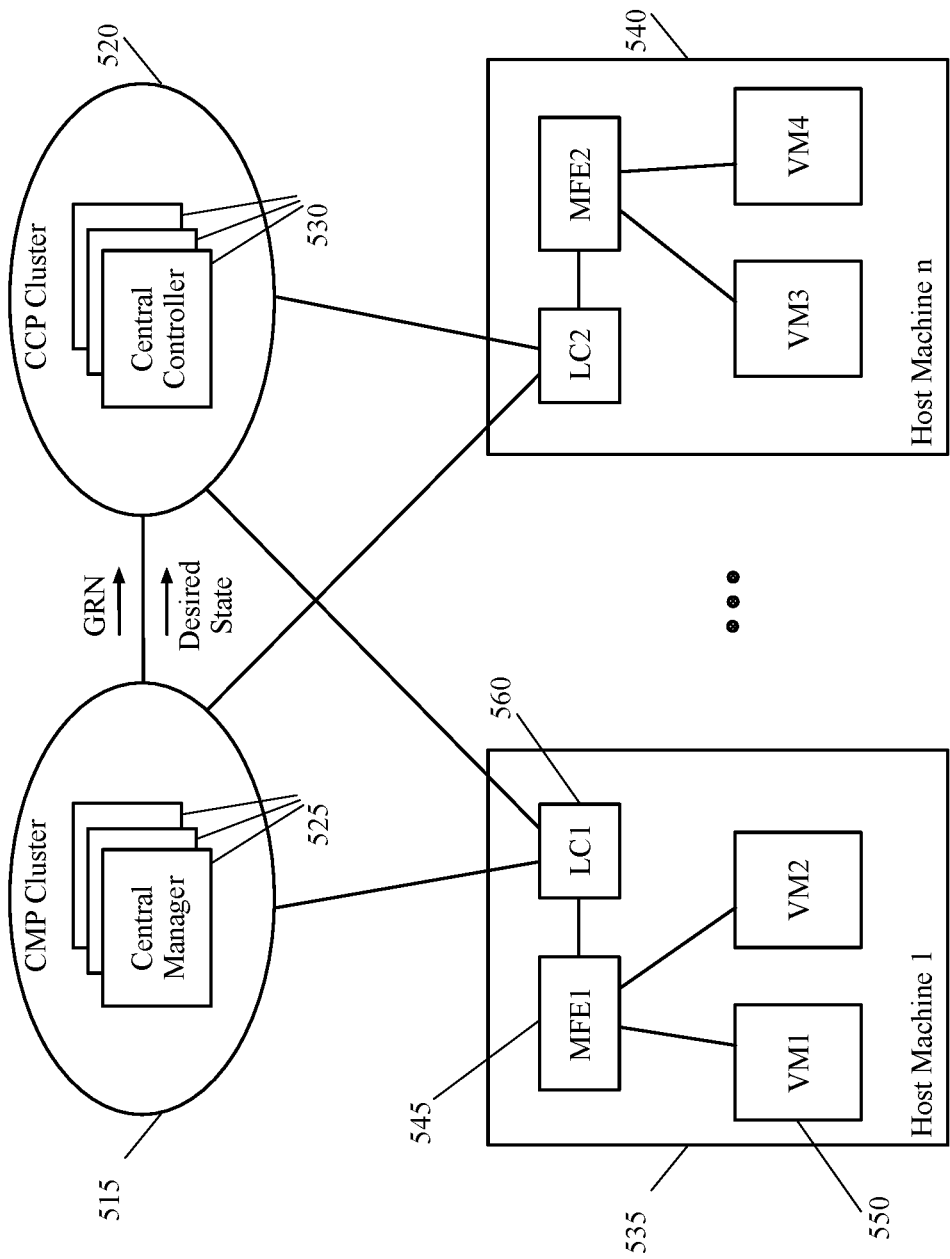
FIG. 5 conceptually illustrates the relationships between the central management plane cluster, the central control plane cluster, and a set of host machines in a hosting system such as a datacenter.

FIG. 5 conceptually illustrates the relationships between the central management plane cluster, the central control plane cluster, and a set of host machines in a hosting system (e.g., a datacenter). The figure shows how a central control plane (CCP) cluster receives a logical network definition (e.g., logical topology) and the GRN from a central management plane (CMP) cluster and publishes the required forwarding and configuration data to a set of host machines. The published configuration and forwarding data enable a set of managed forwarding elements running on the host machines to configure and implement the logical entities (e.g., logical forwarding elements) of the logical network.

FIG. 5 includes a CMP cluster 515, a CCP cluster 520, and two host machines 535 and 540. The host machines shown in the figure include the managed forwarding elements 545 (i.e., MFE1-2) and the data compute nodes 550 (i.e., VM1-4). In some embodiments, the MFEs 545 are implemented in the virtualization software (e.g., hypervisor) of the host machines 535 and 540 (the hypervisors are not shown in the figure for simplicity of description). The CMP cluster 515 includes a set of central managers 525, while the CCP cluster 520 includes a set of central controllers 530. Each host machine also includes a local controller 560 that operates alongside an MFE 545 (e.g., in the hypervisor of the host machine) and configures and manages the associated MFE to implement the logical entities of the logical network.

Each of the managers 525 and controllers 530 can be a physical computing device (e.g., a server, a computer, etc.), a data compute node (DCN) such as a virtual machine (VM), a container, etc., or a software instance (or a process) operating on a physical computing device or DCN. In some embodiments, a manager includes different user interface applications for administration, configuration, monitoring, and troubleshooting of one or more logical networks in a hosting system. A subset of one or more controllers of some embodiments controls the data communications between the different managed forwarding elements (MFEs) that implement the logical elements of a logical network.

As described above, the central control plane (CCP) cluster 520 controls the network data communication between the different DCNs of a logical network (e.g., between some of the VMs 550 in the illustrated example) by controlling the data communication between the MFEs 545. The CCP cluster 520 communicates with the MFEs 545 in order to control the data exchange between the MFEs since the MFEs implement virtual tunnel endpoints (VTEPs) that ultimately exchange the logical network data between the DCNs. In order to control the data exchange, the CCP cluster of some embodiments receives runtime data of the logical network entities (e.g., VMs 550, LFEs of the logical network, etc.) from each of the MFEs. The CCP cluster 520 also receives the logical topology data from the CMP cluster 515 and uses the definition data along with the runtime data in order to control the data communications of the logical network.

That is, based on the runtime data received from the MFEs (e.g., through the local controllers 560) and the network definition data received from the CMP cluster (i.e., the desired state), the CCP cluster generates a set of data (i.e., the translated/shared state) that is pushed to and shared with the MFEs (e.g., through the local controllers 560). In some embodiments, the CCP cluster uses other data that is generated and stored by the CCP cluster (e.g., sharding tables) in order to generate the translated state. The translated state is used by the MFEs in order to physically exchange the data that is logically forwarded by one or more LFEs that the MFEs implement.

Typical logical network definition data, in some embodiments, includes data that defines the location of DCNs (e.g., the location of VMs on host machines), data that defines connection topology between the DCNs and locations of the LFEs in the topology, data that defines middlebox services, which are applied to the LFEs (e.g., distributed firewall policies), etc. Typical runtime data, in some embodiments, includes layer 2 control plane tables such as virtual tunnel endpoint (VTEP) tables, media access control (MAC) tables, address resolution protocol (ARP) tables; layer 3 routing tables such as routing information base (RIB) tables, forwarding information base (FIB) tables; statistics data collected from MFEs, etc.

In some embodiments, the local controller 560 of each hypervisor of the host machines receives logical network data from a central controller 530 of the CCP cluster 520. The local controller 560 then converts and customizes the received logical network data for the local MFE 545 that operates on the same machine on which the local controller operates. The local controller then delivers the converted and customized data to the local MFEs 545 on each host machine. In some embodiments, the connections of the end machines to an LFE (e.g. a logical switch) are defined using logical ports, which are mapped to the physical ports of the MFEs.

As described above, in some embodiments, the LFEs (logical routers and switches) of a logical network are implemented by each MFE that is connected to the logical network. That is, in some embodiments, when the MFE receives a packet from a DCN, the MFE performs the network forwarding processing for the logical switch to which the DCN logically couples, as well as the processing for any additional LFE (e.g., logical router processing if the packet is sent to an external network, logical router processing and processing for the other logical switch in the network if the packet is sent to an end machine (DCN) coupled to the other logical switch, etc.). The GRN that the CMP cluster 515 generates and publishes to the CCP cluster 520 enables the system to determine whether the logical forwarding elements (and any other logical entity) that the MFEs implement are properly configured in the MFEs. That is, the GRN enables the system (or a user) to determine whether the logical entities that are defined for one or more logical networks are realized in the system or not.

One of ordinary skill in the art would realize that the number of the host machines, central managers and controllers, and virtual machines illustrated in the figure are exemplary and a logical network for a tenant of a hosting system may span a multitude of host machines (and third-party switches), and logically connect a large number of DCNs to each other (and to several other physical devices). Additionally, while shown as VMs in this figure and other figures below, it should be understood that other types of data compute nodes (e.g., namespaces, containers, etc.) may connect to logical forwarding elements in some embodiments.

Some embodiments provide a generation number (e.g., within the GRN variable) to identify the clustering events, slice reassignments, or when the MP database has been installed and/or restored. A clustering event includes any change or modification in the CCP cluster that changes the current working set of the cluster in some embodiments. For example a clustering event happens when one controller in the CCP cluster crashes or loses connection to the cluster. Also, a clustering event occurs when a network administrator removes an existing controller or adds a new controller to the CCP cluster.

The slice movement occurs when a work slice assigned to a particular controller of the cluster is reassigned to another controller or generally when there is a change in the work slices that are assigned to a controller. In some embodiments the workload assigned to each controller includes different work slices that are performed for different purposes. For example, a controller may be assigned to compute the configuration and forwarding data for two different sets of logical entities that belong to two different logical networks. In a situation like this, the controller computes the data for the first logical network in a first work slice and the data for the second logical network in a second, different work slice. When the workload on a controller becomes heavy, a work distribution procedure becomes active and moves one or more work slices to another controller in some embodiments. Therefore, even though there is no clustering event (i.e., no change in controllers themselves) the work assignment on the cluster changes and as such, a new generation number is required.

Since the MP stores all of the desired state for all of the logical networks, some embodiment back up the MP at certain time intervals in case of an accident. If an accident does happen, an operator of the network copies a snapshot of the latest backup to the MP. This type of event is called restoring of the MP database, which also requires a new generation number. Therefore, the generation number, in some embodiments, is incremented each time a clustering event or slice reassignment occurs or each time the management plane database is installed or restored. Such increments, in some embodiments, occur automatically (e.g., with each new clustering event). In some embodiments a user can also (manually) increment the generation number (e.g., when a backup version of the MP database is restored).

In some embodiments the MP queries (e.g., through a remote procedure call) the CCP cluster to ensure that the generation number is synched between all the CCP nodes. Each CCP node, in some such embodiments, replies to the query with its most recent generation number. When the generation number is not the same across all of the replies, the MP can conclude that some clustering change that has happened recently has not been processed by some of the CCP nodes yet. In some embodiments, the generation number is a variable separate from the GRN. In some such embodiments, however, each generation number is associated with a GRN. In some embodiments, a universally unique identifier (UUID) includes both the generation number and the GRN (e.g., both GRN and generation number could be encoded in a single 64-bit UUID, where the top 16 bits hold the generation number and the lower 48 bits hold the GRN).

In some embodiments the management plane provides a GRN interface to a user that allows the user to query the realization status of a given entity (or a set of entities) within the context of a desired state version number (i.e., the GRN). Each CCP node of some such embodiments then replies to this query with a realized state message (or a timeout is reached message). When one or more of the CCP nodes do not reply, the management plane of some embodiments retries for a preset number of times and if still no reply received from the CCP nodes, returns either an error message or a non-available message (indicating which CCP nodes are nonresponsive). The management plane of some other embodiments returns an error message or a non-available message to the user's query when some of the CCP nodes do not reply to the query submitted by the user.

On the other hand, when all the CCP nodes respond but the generation number is not the same across all of the replies, the management plane of some embodiments concludes that some clustering change (e.g., clustering event, slice movement, etc.), that has happened recently, has not been processed by some of the CCP nodes yet. In some embodiments, the MP responds with a message that shows failure in realization of the user API call, while in some other embodiments, the MP queries the CCP cluster again one or more times before returning a failed realization message. When the generation number is the same across the CCP cluster, the MP can continue with evaluating the realization statuses in all of the responses received from the CCP nodes.

When at least one of the realization messages indicates no success, the MP of some embodiments realizes that the corresponding CCP node has not processed the specified desired state version or the corresponding runtime state version. In this case, MP does not look at the MFE status in the response and replies to the user that realization is in progress (or the corresponding controller has not processed the logical entity yet). As will be discussed below, the CCP cluster nodes of some embodiments return the MFEs that have not realized the logical entities yet to the MP when queried for the realization status.

In some embodiments, when the realization status in every response from the CCP cluster indicates success, the MP of some embodiments looks at the MFE status for which the CCP cluster has returned an unsuccessful realization status. That is, in some embodiments, the realization status response received from the CCP cluster includes one or more particular fields that identify the MFEs that have not been realized properly for the desired state. In some such embodiments, when none of the replies from the CCP cluster carries an unsuccessful realization message for any MFE, the MP returns a successful realization message, which means that all of the logical entities up to the GRN value specified in the query are realized and working properly.

Figure 6:
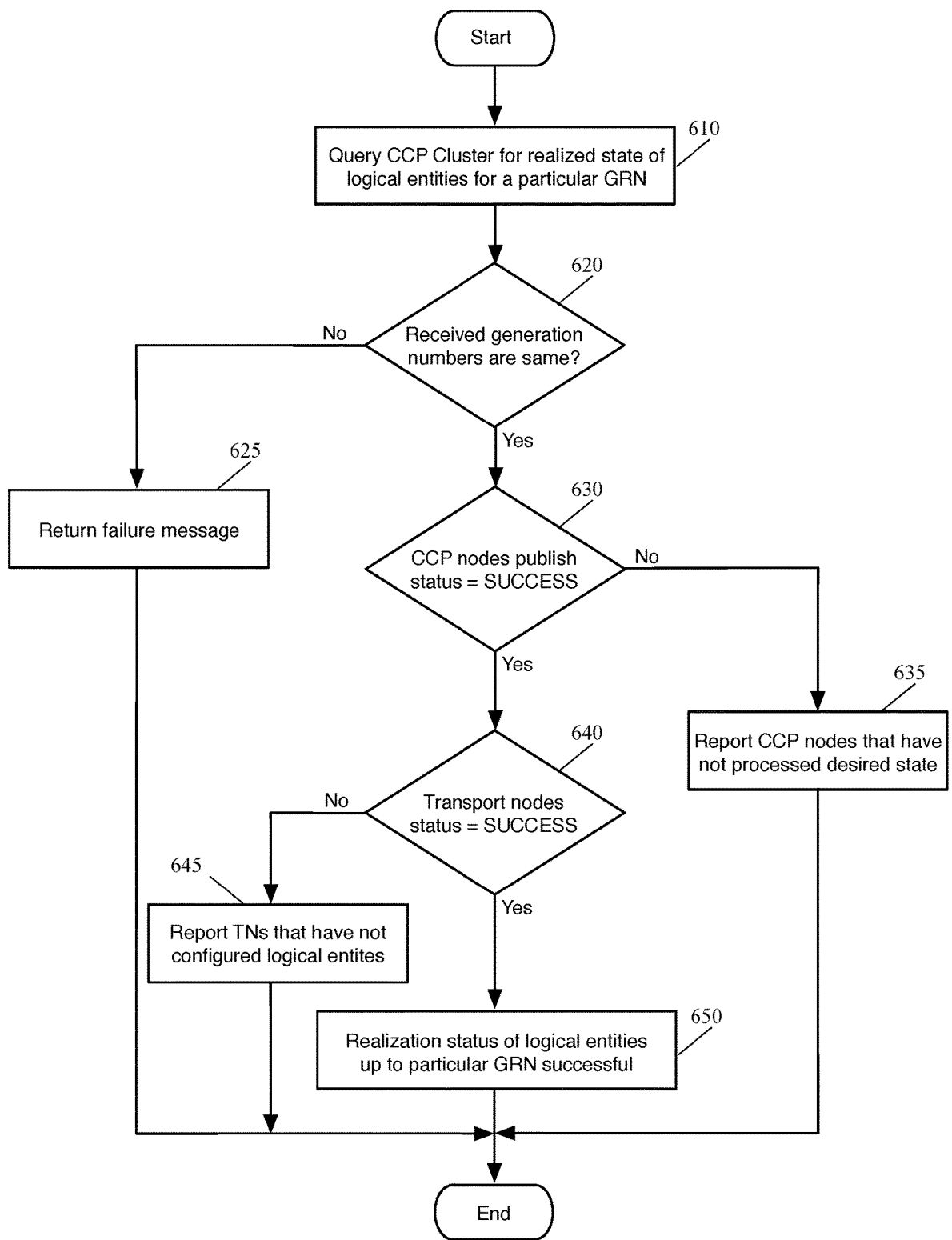
FIG. 6 conceptually illustrates a process of some embodiments that queries the CCP cluster for a particular GRN and reports the realization status of the logical entities based on the response the process receives from the CCP cluster.

FIG. 6 conceptually illustrates a process 600 of some embodiments that queries the CCP cluster for a particular GRN and reports the realization status of the logical entities based on the response the process receives from the CCP cluster. In some embodiments, the process is performed by a manager computer or a manager application that executes on a manager computer. The manager computer (or application) of some such embodiments creates and manages one or more logical networks on a physical network infrastructure (e.g., a datacenter network) for one or more users (e.g., different tenants of the datacenter).

The process 600 starts by querying (at 610) the controllers (computers and/or applications) of a CCP cluster for realization status of one or more logical entities (e.g., logical switches, logical routers, logical firewalls, logical load balancers, etc.) that is associated with a particular GRN value. In some embodiments, the process receives a query from a user (e.g., network administrator of the datacenter) in which, the user specifies the logical entities that should be queried from the CCP cluster and the GRN value. In some embodiments, the user only specifies the GRN value in the query that is submitted to the management plane, and the process queries for the realization status of all of the logical entities that have been created (and/or modified) and published to the CCP cluster.

The process then determines (at 620) whether the responses to the query contain the same generation number across the CCP cluster. As described above, because of a recent change in the CCP cluster (e.g., clustering event, work slice movement, etc.) one or more cluster nodes may have a different generation number than the other nodes. As such, the realization status in the responses should not be relied upon. When the process determines that there is a discrepancy in the generation numbers of the controllers, the process of some embodiments foregoes further inspection of the replies and returns (at 625) a failure message to the user. In some embodiments, the message does not show a failure in realization and simply indicates that because of a clustering event, the query should be submitted at a later time. Yet in some other embodiments, the process automatically retries querying the CCP cluster for a few more times (e.g., a number of times that can be set and adjusted by a user) before returning the failure and/or in-progress message. After returning the message, the process ends.

When the process determines (at 620) that the responses to the query contain the same generation number across the CCP cluster, the process determines (at 630) whether the realization statuses in all of the responses show that the controllers have properly computed the configuration and forwarding data based on the desired states and their corresponding runtime states of the logical entities. In other words, the process determines whether every controller (1) has processed the desired states of one or more logical entities received from the management plane and the corresponding runtime states for the same logical entities received from the MFEs, and (2) has pushed down the processed data to the MFEs (e.g., through the MFEs' corresponding local controllers) to implement the logical entities.

When the process determines (at 630) that one or more of the CCP nodes have not processed and distributed the configuration data successfully, the process returns (at 635) a report of the controllers that still have not processed the data. The process of some embodiments indicates in the report that these controllers are still in the process of realizing the logical entities. In some embodiments, the process makes a few more attempts to determine whether all the controllers have realized the logical entities before returning the message that some of the controllers are still processing the data. After returning the report, the process ends.

When the process determines that the realization statuses in all of the responses received from the controllers show that the controllers have properly computed the configuration and forwarding data, the process determines (at 640) whether the realization statuses in all of the responses show that the local controllers have properly configured the MFEs, based on the configuration and forwarding data received from the CCP cluster, to implement the logical entities. In some embodiments, each controller not only indicates (e.g., through one or more fields of the response the controller generates) that the controller has generated the configuration data for a logical entity and pushed the data to the corresponding MFEs, but also indicates (e.g., through a different set of fields generated in the response) that which MFEs still have not been configured to implement the logical entity (if any).

That is, when a controller of the CCP cluster receives (from the MP) a request for realization status of a logical entity, the controller first identifies the latest generation number that the controller carries and inserts the identified generation number to a realization response to the request. The controller then determines whether the controller has processed the logical entity definition data received from the management plane together with the logical entity runtime data received from the MFEs. If the controller has successfully processed these data (i.e., generated the configuration and forwarding data for the logical entity) and delivered the processed data to a set of corresponding local controllers running on a set of host machines, the controller also inserts a succeed message in the realization response.

Finally, the controller of some embodiments also determines whether the logical entity has been successfully configured (by the local controllers) on the corresponding MFEs that the controller manages. When the controller identifies one or more MFEs on which the logical entity has not been configures yet, the controller also inserts, in the realization response, the MFEs (identifiers of the MFEs) on which the logical entity is not configured yet.

When the process determines that the transport realization statuses in one or more of the responses received from one or more controllers show that some of the local controllers are still configuring their corresponding MFEs, the process reports (at 645) that some of the MFEs have not realized the logical entities yet. The process of some embodiments indicates in the report that the MFEs are still in the process of realizing (configuring) the logical entities. Similar to the previous operations, in some embodiments, the process makes a few more attempts to determine whether all of the local controllers have configured the logical entities on the MFEs before returning the message that some of the local controllers are still configuring the MFEs. After returning the report, the process ends.

On the other hand, when the process determines (at 640) that the realization statuses in all of the responses show that the local controllers have properly configured all of the MFEs to implement the logical entities, the process returns (at 650) a message that all of the logical entities at the queried GRN have been successfully realized in the network. The process then ends.

It is important to notice that many of the above operations are described based on the assumption that the user queries the management plane with a GRN value that the user receives after the creation and/or modification of the last logical entity in the set of logical entities for which the user queries the system. Therefore, some of the operations are described as returning a in-progress (still processing the data) message. It should be understood that if a user queries the system with an earlier GRN value that was generated before the last modification of a logical entity, the process of some embodiments does not make any more efforts to query the CCP cluster again when the first response indicates that the logical entity was not realized at the earlier GRN value.

Additionally, the specific operations of the process 600 may not be performed in the exact order shown and described. The specific operations may not be performed in one continuous series of operations, and different specific operations may be performed in different embodiments. For example, some embodiments, before inspecting the generation number in the received responses from the CCP nodes, first ensure that all of the controllers have responded to the query. Some such embodiments return an error message when one or more CCP nodes do not respond to the query. Some other embodiments query the CCP cluster again in a short while to try to get a response from every single cluster node. Only after every cluster node has sent a reply, these embodiments start inspecting the responses for generation number and realization status of the logical entities. Lastly, one of ordinary skill in the art would realize that the process 600 could be implemented using several sub-processes, or as part of a larger macro process.

Figure 7:
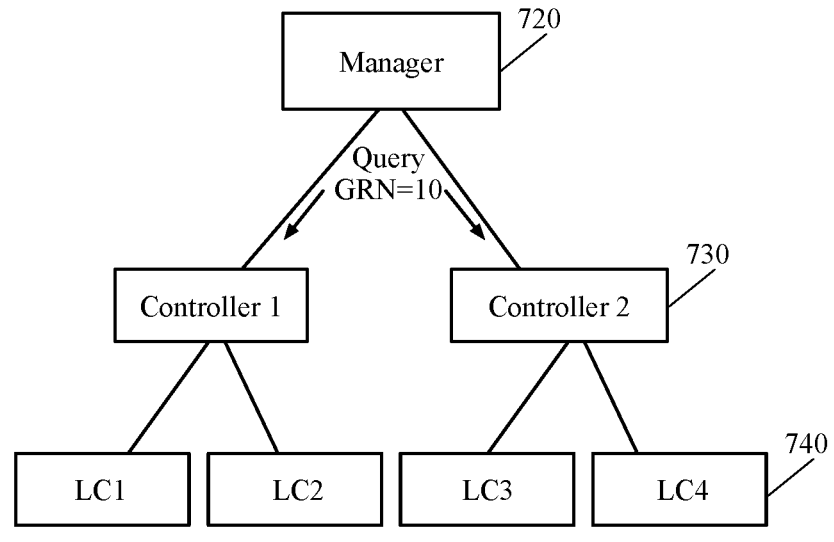
FIG. 7 illustrates an example of a response that the control plane of some embodiments returns after receiving a query for realization status of one or more logical entities at a particular GRN.
Figure 7:
Figure 7:
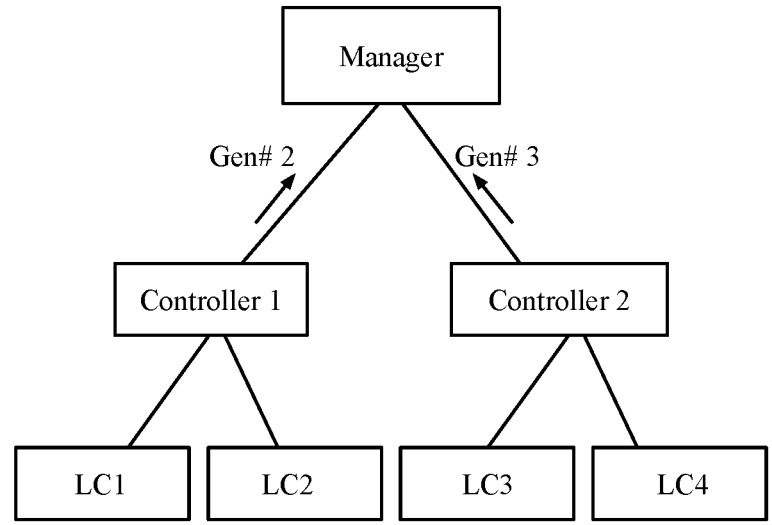

FIG. 7 illustrates an example of a response that the control plane of some embodiments returns after receiving a query for realization status of one or more logical entities up to a particular GRN. This figure shows, in two separate stages 705 and 710, that the control plane queries the CCP cluster for realization status of every logical element that has been created, and/or modified up until a particular value for the GRN. The figure includes a manager 720 (e.g., in the CMP cluster), two controllers 730 (e.g., in the CCP cluster), and four local controllers 740 (e.g., in four different host machines (not shown)).

In the first stage 705, the manager 710 has submitted a request for realization status of every logical element that has been created, and/or modified up until GRN=10. The Manager queries the two controllers 730, which are responsible for configuration of the logical entities on the four host machines (i.e., the hypervisors of the host machines) on which the four local controllers 740 operate. As shown, controller 1 in the CCP cluster is responsible for generation of configuration and forwarding data for the local controllers LC1 and LC2, while controller 2 is responsible for generation of configuration and forwarding data for the local controllers LC3 and LC4. Each of the local controllers 640 receives the data, which defines common forwarding behaviors of an MFE that operates on the same hypervisor as the local controller, from its corresponding controller in the CCP cluster. Each local controller then generates configuration and forwarding data that is specific to its corresponding MFE in order to implement the logical entities and delivers the generated customized data to the MFE.

The second stage shows that the two controllers 730 return two different generation numbers (i.e., Gen #2 and Gen #3) to the manager 720. As discussed before, there can be different reasons for having different generation numbers in the responses that the manager receives from the CCP cluster. For example because of a recent change in the CCP cluster (e.g., clustering event, work slice movement, etc.), one or more cluster nodes may have a different generation number than the other nodes. As such, when the manager 720 realizes that there is a discrepancy in the generation numbers received from the CCP cluster, the manager stops looking further into responses received from the CCP cluster for identifying the realization status. The manager of some such embodiments returns a failure message, or alternatively, reports to the user that a recent clustering event has occurred and the user needs to query the realization status of the logical entities at a later time.

As described above, the CCP cluster (e.g., one or more CCP nodes in the CCP cluster) of some embodiments returns a message for the realization status of a logical entity (in response to a realization state query of the logical entity). In some embodiments the returned message can be a success message, a not success message, or an in progress message. A success status, in some embodiments, indicates that the CCP cluster has processed the received desired state and pushed the processed data to the local control plane (e.g., one or more local controllers that operate alongside the MFEs in the same host machines). In some embodiments, each time the MP increments the GRN, the MP syncs the incremented GRN with the CCP cluster. In some embodiments, one of the controller nodes (e.g., a sharding master controller) assigns the same GRN to the current runtime state kept at the controllers of the CCP cluster. In some embodiments, the realization status for a particular value of the GRN is considered successful when the CCP cluster has processed both the desired state and the corresponding runtime state of the logical entities for the particular GRN value.

In some embodiments, the success message is indicative of not only that the desired state (and the corresponding runtime state) of a logical entity has been processed and published by the CCP cluster, but also that the logical entity is successfully configured on one or more MFEs (operating on host machines or gateways) that implement the logical entity. For example, a success response for realized state of a logical switch, in some such embodiments, means that one or more MFEs that implement the logical switch (e.g., on hypervisors of one or more host machines) are successfully connected to one or more virtual machines that logically connect to the logical switch. It further means that the MFEs have active communications with the control plane (e.g., a master controller of the logical switch) and the management plane (e.g., a master manager of the logical switch) for the logical switch.

In some embodiments, each time the MP increments the GRN, the MP syncs the incremented GRN with the CCP cluster. In some embodiments, one of the controller nodes (e.g., a sharding controller in the cluster) assigns the same GRN to the current runtime state that is received for the logical entities from the MFEs and kept at the controllers of the CCP cluster. In some embodiments, the CCP realization status of a logical entity for a particular value of the GRN is considered successful when the CCP cluster has processed both the desired state for the logical entities and the corresponding runtime state of the logical entities at the particular GRN value.

An unsuccessful realization response for the status of a logical entity may have different reasons in some embodiments. For example, when one or more CCP nodes have fallen behind in processing the desired state updates, the CCP nodes may return unsuccessful realization of the desired states. Other reasons for unsuccessful realization of the desired state for a logical entity include, when one or more MFEs explicitly indicate that they have failed to implement some changes for a particular value of GRN, when one or more MFEs fall behind in keeping up with desired state update frequency, when some MFEs get disconnected for a long period, etc.

Some embodiments provide troubleshooting data to help identify the source of various problems in the realization of the desired state. Some embodiments provide different levels of details for problematic logical entities based on the nature and location of the identified problems. Some embodiments provide the troubleshooting data with respect to specific logical elements that fail to become realized.

Figure 8:
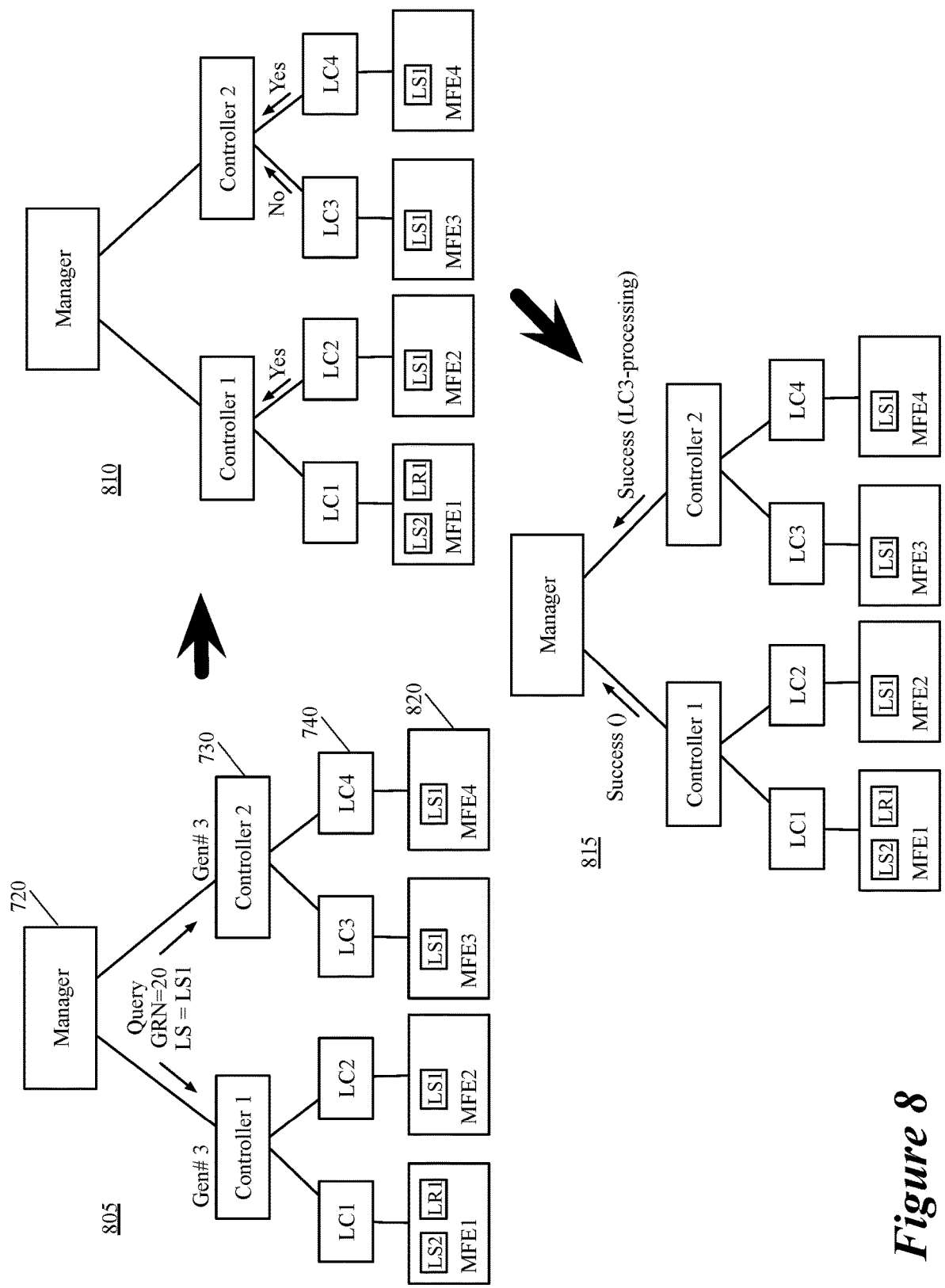
FIG. 8 illustrates another example of a response that the control plane of some embodiments returns after receiving a query for realization status of one or more logical entities at a particular GRN.

FIG. 8 illustrates another example of a response that the control plane of some embodiments returns after receiving a query for realization status of one or more logical entities at a particular GRN. This figure shows, in tree separate stages 805, 810, and 815, that the control plane queries the CCP cluster for realization status of a particular logical element that has been published to the control plane up to a particular value for the GRN. The figure includes a manager 720 (e.g., in the CMP cluster), two controllers 730 (e.g., in the CCP cluster), four local controllers 740, and four MFEs 820, each of which is associated with one of the local controllers (i.e., both of the local controller and its associated MFE operate in the hypervisor of a separate host machine).

In the first stage 805, the manager 710 has submitted a request for realization status of the logical switch LS1 at GRN=20. The Manager queries the two controllers 730, which are responsible for configuration of the logical switch LS1 on the MFEs 820 that implement the logical switch LS1. As shown though, only MFE2-4 implement the logical switch LS1. That is, the logical ports of LS1, to which a set of end machines on each of the host machines couple, are only implemented in MFE2, MFE3, and MFE4. In other words, these logical ports of LS1 logically connect a set of end machines that resides on the host machine on which MFE2 executes, to other end machines that reside on the host machines on which MFE3 and MFE4 execute. MFE1, on the other hand, implements the logical switch LS2 and the logical router LR1.

The first stage also shows that at this point of time (i.e., GRN=20), the generation numbers on both of the controllers 730 are the same, which means that the CCP nodes are synchronized (with respect to the latest clustering event) and therefore the realization determination process can continue. Additionally, the figure shows that controller 1 in the CCP cluster is responsible for generation of configuration and forwarding data for LS1, LS2, and LR1, for the local controllers LC1 and LC2, while controller 2 in the CCP cluster is responsible for generation of configuration and forwarding data for LS1 for the local controllers LC3 and LC4. Although in the illustrated example, both of the controllers 730 generate and distribute the logical configuration and forwarding data for the logical switch LS1, in some embodiments, each controller of the CCP cluster is responsible for configuration of a particular set of logical entities (i.e., two CCP nodes do not manage a same logical entity at the same time in some embodiments).

The second stage shows that since MFE1 does not implement the logical switch LS1, the CCP cluster does not query the local controller that is associated with this MFE (i.e., LC1) and as such this local controller does not send a response to the CCP cluster to be forwarder to the management plane. In other words, at each particular GRN, each of the controllers 730 knows the logical elements that the controller has processed and pushed down to the different MFEs. That is, each controller knows which MFEs the controller manages and which logical elements are implemented on which MFEs that the controller manages. Therefore, when the user asks for the realization status of the desired logical entity (i.e., LS1 in this example) at a particular GRN (i.e., GRN=20), the controllers 730 only request the realization status of the MFEs to which the configuration data of LS1 was pushed up to G=20.

The second stage also shows that out of the three local controllers that were requested to send the realization status of the logical switch LS1, local controllers LC2 and LC4 respond by returning the status of the logical switch up to GRN=20 as realized, and local controller LC3 responds by returning the status of LS1 as not realized (yet). The reason for unsuccessful realization of the logical switch LS1 on MFE3 could be that the controller LC3 has fallen behind in generating the customized data for configuring LS1 on MFE3. Another reason could be that controller 2 has fallen behind in generation and delivery of the configuration data of LS1 to the local controller LC3. However, as described below in the third stage, this controller sends a success message in realization of the logical switch on the controller, which is indicative that controller 2 has not fallen behind in this example.

In the third stage, each of the controllers 730 sends a success message (in the response to the query) in realization of the logical switch LS1, however, the success message of controller 2 contains (e.g., in one or more fields of the message) the local controller that is still processing the configuration data for LS1 at GRN=20. On the other hand, controller 1 does not have any local controller in the success message that it returns to the manager 720. The manager 720, based on the messages that it receives from the CCP cluster, is able to determine at which level the realization of the logical entity was not successful. That is, when both of the controllers of the CCP cluster return a success message, the manager concludes that the logical switch LS1 is realized in the CCP cluster (i.e., the switch's configuration data has been processed and pushed to the local controllers). However, when one or more of the CCP nodes indicate, in their messages, that some MFEs have not realized the logical element, the manager can identify the MFEs and host machines that are still processing the data (up to GRN=20) for the queried logical entity.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
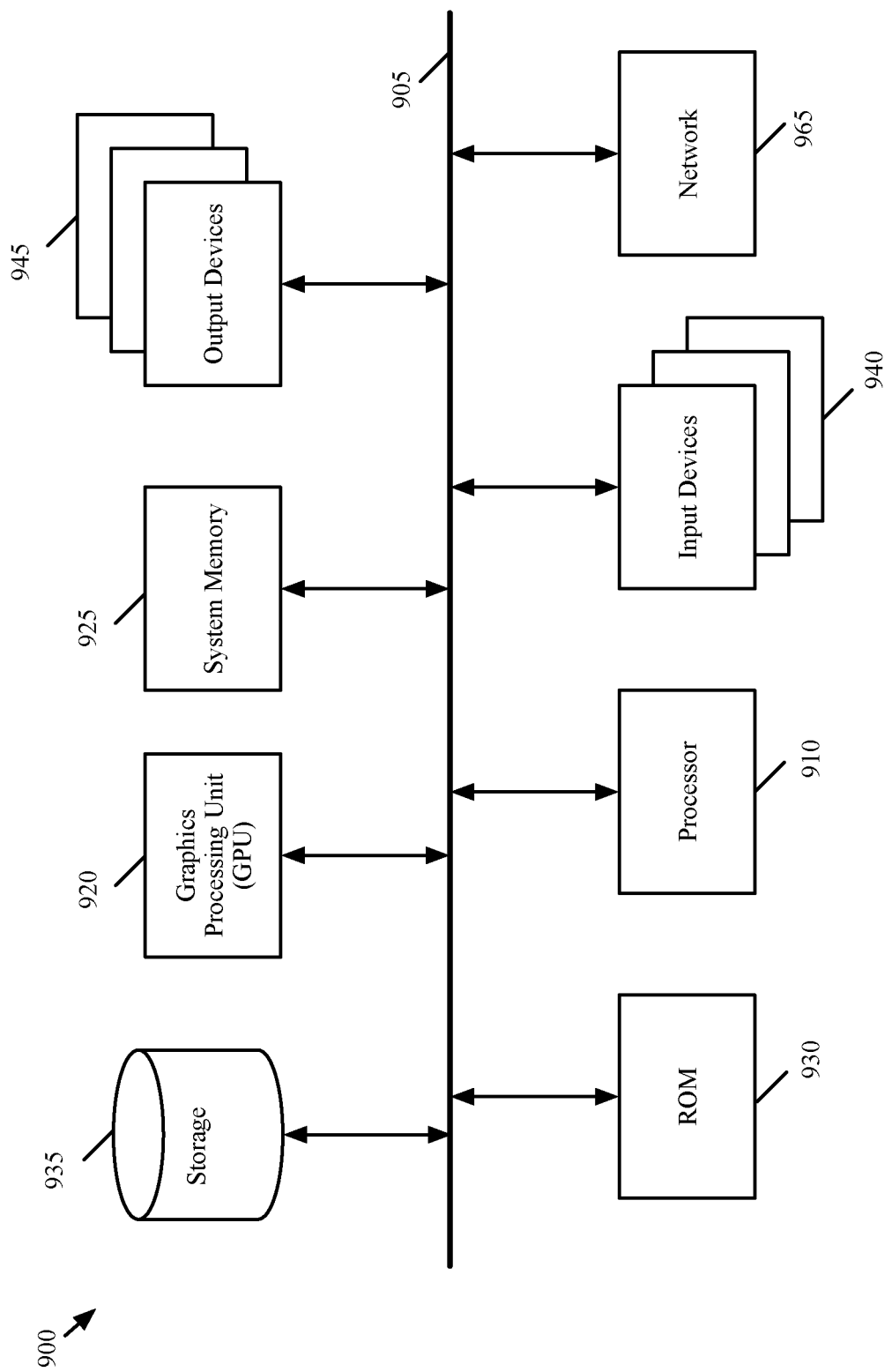
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIG. 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for a network manager to determine a realization status of a set of logical entities of a logical network, the method comprising:
   sending a request to a network controller for a realization status of a desired state for a set of logical entities up to a particular point in time;
   in response to the request, receiving a reply that indicates (i) whether configuration data up to the particular point in time for each logical entity in the set has been processed and distributed to a set of local controllers operating on a set of host machines to configure respective managed forwarding elements (MFEs) also operating on the host machines and (ii) whether the local controllers have configured their respective MFEs to implement the logical entities in the set,
   wherein when the local controllers have not all configured their respective MFEs to implement the logical entities in the set, the reply further comprises identifiers of MFEs on which the subset of logical entities are not configured.

2. The method of claim 1, wherein the request comprises a realization number that corresponds to the particular point in time, wherein the network controller stores a publication order comprising realization numbers and logical entity desired states published to the network controller.

3. The method of claim 2, wherein the network controller uses the realization number in the request and the publication order to respond to the request.

4. The method of claim 1 further comprising publishing desired state data to the controller for at least one of the logical entities prior to sending the request.

5. The method of claim 1, wherein the network controller belongs to a central control plane cluster comprising a plurality of network controllers, the method further comprising:
   sending requests to each network controller of the plurality of network controllers for the realization status of the desired state for the set of logical entities up to the particular point in time; and receiving replies from each of the network controllers that indicate whether configuration data up to the particular point in time for each logical entity in the set has been processed and distributed to a respective set of local controllers.

6. The method of claim 1, wherein when the reply indicates that the configuration data has not been processed and distributed to the set of local controllers, the method further comprises sending a second request to the network controller for the realization status of the desired state of the logical entities up to the particular point in time.

7. The method of claim 1, wherein when the reply indicates that the configuration data has not been processed and distributed to the set of local controllers, the reply does not provide a separate indication as to whether the local controllers have configured their respective MFEs to implement the logical entities in the set.

8. The method of claim 1 further comprising generating a report of the MFEs on which the logical entities are not configured.

9. The method of claim 1, wherein when the reply indicates that the local controllers have not all configured their respective MFEs to implement the logical entities in the set, the method further comprises sending a second request to the network controller for the realization status of the desired state of the logical entities up to the particular point in time.

10. The method of claim 1, wherein a first MFE operating on a first host computer receives a data packet from a data compute node operating on the first host computer, performs forwarding processing on the data packet according to the set of logical entities that the first MFE is configured to implement, and forwards the data packet to a second MFE that operates on a second host computer and also implements at least a subset of the logical entities.

11. A non-transitory machine readable medium storing a network manager program which when executed by at least one processing unit determines a realization status of a set of logical entities of a logical network, the network manager program comprising sets of instructions for:

sending a request to a network controller for a realization status of a desired state for a set of logical entities up to a particular point in time;

in response to the request, receiving a reply that indicates (i) whether configuration data up to the particular point in time for each logical entity in the set has been processed and distributed to a set of local controllers operating on a set of host machines to configure respective managed forwarding elements (MFEs) also operating on the host machines and (ii) whether the local controllers have configured their respective MFEs to implement the logical entities in the set, wherein when the local controllers have not all configured their respective MFEs to implement the logical entities in the set, the reply further comprises identifiers of MFEs on which the subset of logical entities are not configured.

12. The non-transitory machine readable medium of claim 11, wherein the request comprises a realization number that corresponds to the particular point in time, wherein the network controller stores a publication order comprising realization numbers and logical entity desired states published to the network controller.

13. The non-transitory machine readable medium of claim 12, wherein the network controller uses the realization number in the request and the publication order to respond to the request.

14. The non-transitory machine readable medium of claim 11, wherein the network manager program further comprises a set of instructions for publishing desired state data to the controller for at least one of the logical entities prior to sending the request.

15. The non-transitory machine readable medium of claim 11, wherein the network controller belongs to a central control plane cluster comprising a plurality of network controllers, the network manager program further comprising sets of instructions for:

sending requests to each network controller of the plurality of network controllers for the realization status of the desired state for the set of logical entities up to the particular point in time; and receiving replies from each of the network controllers that indicate whether configuration data up to the particular point in time for each logical entity in the set has been processed and distributed to a respective set of local controllers.

16. The non-transitory machine readable medium of claim 11, wherein the network manager program further comprises a set of instructions for sending a second request to the network controller for the realization status of the desired state of the logical entities up to the particular point in time when the reply indicates that the configuration data has not been processed and distributed to the set of local controllers.

17. The non-transitory machine readable medium of claim 11, wherein when the reply indicates that the configuration data has not been processed and distributed to the set of local controllers, the reply does not provide a separate indication as to whether the local controllers have configured their respective MFEs to implement the logical entities in the set.

18. The non-transitory machine readable medium of claim 11, wherein the network manager program further comprises a set of instructions for generating a report of the MFEs on which the logical entities are not configured.

19. The non-transitory machine readable medium of claim 11, wherein the network manager program further comprises a set of instructions for sending a second request to the network controller for the realization status of the desired state of the logical entities up to the particular point in time when the reply indicates that the local controllers have not all configured their respective MFEs to implement the logical entities in the set.

20. The non-transitory machine readable medium of claim 11, wherein a first MFE operating on a first host computer receives a data packet from a data compute node operating on the first host computer, performs forwarding processing on the data packet according to the set of logical entities that the first MFE is configured to implement, and forwards the data packet to a second MFE that operates on a second host computer and also implements at least a subset of the logical entities.

* * * * *